(12) United States Patent
Kast et al.

(10) Patent No.: US 11,441,470 B2
(45) Date of Patent: Sep. 13, 2022

(54) MIXER DEVICE

(71) Applicant: Purem GmbH, Neunkirchen (DE)

(72) Inventors: Peter Kast, Esslingen (DE); Michael Dentler, Reichenbach (DE); Vincent Eder, Esslingen (DE); Mathias Rothfuss, Waiblingen (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 17/036,927

(22) Filed: Sep. 29, 2020

(65) Prior Publication Data
US 2021/0115829 A1 Apr. 22, 2021

(30) Foreign Application Priority Data
Oct. 18, 2019 (DE) .................... 10 2019 128 193.8

(51) Int. Cl.
| | |
|---|---|
| *F01N 1/00* | (2006.01) |
| *F01N 3/28* | (2006.01) |
| *F01N 3/20* | (2006.01) |
| *B01F 25/431* | (2022.01) |

(52) U.S. Cl.
CPC ......... *F01N 3/2892* (2013.01); *F01N 3/2066* (2013.01); *B01F 25/4315* (2022.01); *F01N 2240/20* (2013.01)

(58) Field of Classification Search
CPC ... F01N 3/2892; F01N 3/2066; F01N 2240/20
See application file for complete search history.

(56) References Cited

U.S. PATENT DOCUMENTS

| | | | |
|---|---|---|---|
| 5,105,621 A | 4/1992 | Simmons et al. | |
| 8,726,640 B2 * | 5/2014 | Tilinski | F01N 3/2892 60/303 |
| 10,711,677 B2 * | 7/2020 | Noren, IV | B01F 23/2132 |
| (Continued) | | | |

FOREIGN PATENT DOCUMENTS

| | | |
|---|---|---|
| CN | 1207208519 A | 9/2017 |
| CN | 107980078 A | 5/2018 |
| (Continued) | | |

OTHER PUBLICATIONS

English translation of Japanese Patent Application Publication No. JP 2016089823 (May 2016) (Year: 2016).*

*Primary Examiner* — Jason D Shanske
(74) *Attorney, Agent, or Firm* — McGlew and Tuttle, P.C.

(57) ABSTRACT

An internal combustion engine exhaust system mixer device includes a bottom element (12) includes a downstream rear side (22) and a front side (44). The bottom element has a reactant introduction opening (31), open to a reactant receiving volume (46), and expands therefrom radially from the reactant introduction opening toward the front side. Exhaust gas passage ducts (58), arranged following one another in the circumferential direction about the opening axis (A), open to the reactant receiving volume. A swirl generation element (20) is connected to the bottom element and encloses the opening axis. A mixing volume (64) adjoins the reactant receiving volume in the direction of the opening axis and is formed in the swirl generation element. A plurality of exhaust gas passage openings (66), following one another in the circumferential direction, about the opening axis are provided in the swirl generation element.

20 Claims, 3 Drawing Sheets

(56) References Cited

U.S. PATENT DOCUMENTS

| | | | |
|---|---|---|---|
| 2012/0090305 A1 | 4/2012 | Floyd et al. | |
| 2013/0167516 A1* | 7/2013 | Loman | F01N 3/10 60/319 |
| 2014/0334986 A1* | 11/2014 | Stanavich | F01N 3/021 422/168 |
| 2016/0215673 A1* | 7/2016 | Noren, IV | B01F 25/4521 |
| 2018/0135487 A1 | 5/2018 | Vempati et al. | |
| 2019/0186321 A1* | 6/2019 | Abbassi | F01N 3/2066 |
| 2020/0040792 A1* | 2/2020 | Boldt | F01N 13/00 |

FOREIGN PATENT DOCUMENTS

| | | | |
|---|---|---|---|
| DE | 4203807 A1 | 8/1993 | |
| DE | 112011103519 T5 | 10/2013 | |
| DE | 102013012909 A1 | 2/2015 | |
| DE | 112016000450 T5 | 12/2017 | |
| DE | 102014108809 C5 | 4/2019 | |
| EP | 0590699 A1 | 4/1994 | |
| EP | 3321484 A1 | 5/2018 | |
| GB | 2523084 A | 8/2015 | |
| JP | 2013133774 A | 7/2013 | |
| JP | 2016089823 A * | 5/2016 | B01F 5/0618 |
| JP | 2016217337 A | 12/2016 | |
| JP | 2018534458 A | 11/2018 | |
| WO | 2014112072 A1 | 7/2014 | |
| WO | WO-2016118720 A1 * | 7/2016 | B01F 3/04049 |

\* cited by examiner

MIXER DEVICE

CROSS REFERENCE TO RELATED APPLICATIONS

This application claims the benefit of priority under 35 U.S.C. § 119 of German Application 10 2019 128 193.8, filed Oct. 18, 2019, the entire contents of which are incorporated herein by reference.

TECHNICAL FIELD

The present invention pertains to a mixer device for an exhaust system of an internal combustion engine.

TECHNICAL BACKGROUND

Such mixer devices ensure in exhaust systems of internal combustion engines configured especially as diesel engines that a reactant, for example, a urea/water solution, which is injected into the exhaust gas stream, is efficiently mixed with the exhaust gas, so that the catalytic reaction leading to a reduction of the percentage of nitrogen oxides in the exhaust gas can take place in a catalytic converter device following downstream, especially in an SCR catalytic converter device.

A mixer device, which comprises an approximately cylindrical exhaust gas mixing pipe, is known from DE 10 2014 108 809 C5. A bottom element, at which a reactant release device injecting the reactant into a mixing volume formed in the exhaust gas mixing pipe, which reactant release device is generally also called an injector, is carried at an axial end area of the exhaust gas mixing pipe. A plurality of rows of exhaust gas passage openings, through which exhaust gas flowing around the exhaust gas mixing pipe can enter into the mixing volume and can be mixed with the reactant there, are formed in the exhaust gas mixing pipe following one another in the direction of a pipe longitudinal axis. Exhaust gas passage openings are also provided in an essentially conically radially expanding length area of the exhaust gas mixing pipe.

SUMMARY

An object of the present invention is to provide a mixer device, which provides an improved mixing ratio for the injected reactant with a reduced risk of formation of deposits, for an exhaust system of an internal combustion engine.

This object is accomplished according to the present invention by a mixer device for an exhaust system of an internal combustion engine, comprising:

a bottom element with a rear side to be positioned facing away from an exhaust gas stream in an exhaust system and with a front side to be positioned facing the exhaust gas stream, wherein a reactant introduction opening is formed in the bottom element, wherein the reactant introduction opening is open towards a reactant receiving volume expanding radially on the front side of the bottom element starting from the reactant introduction opening in the direction of an opening axis, wherein a plurality of exhaust gas passage ducts, which are arranged following one another in the circumferential direction about the opening axis, are open to the reactant receiving volume, and extend, for example, approximately radially, are provided in the bottom element, and a swirl generation element, which is connected to the bottom element and encloses the opening axis in a ring-like manner (with a ring shape configuration), wherein a mixing volume adjoining the reactant receiving volume in the direction of the opening axis is formed in the swirl generation element, and a plurality of exhaust gas passage openings following one another in the circumferential direction about the opening axis are provided in the swirl generation element.

In the mixer device configured according to the present invention, the bottom element not only has the task of axially closing the mixing volume provided in a swirl generation element and of carrying the reactant introduction device for injecting the reactant, but it also provides with the reactant receiving volume a volume, into which an exhaust gas stream enclosing the injected reactant is generated via the exhaust gas passage ducts open to said reactant receiving volume. This feeding of exhaust gas into the reactant receiving volume ensures that no reactant droplets deflected from the spray cone by a flow deflection or swirls can collect at the bottom element and form deposits there. The exhaust gas stream introduced into the reactant receiving volume ensures that the entire quantity of the reactant injected will enter into the area of the mixing volume and can efficiently be mixed there with the exhaust gas likewise introduced into the mixing volume via the exhaust gas passage openings.

For a permanent connection to the bottom element, the swirl generation element may be placed axially with a ring shape connection area onto a mounting area on the front side of the bottom element and be connected to the bottom element.

A configuration that can be embodied in a structurally simple manner and that efficiently prevents the deposition of reactant on the bottom element can be obtained by at least one and preferably each exhaust gas passage duct comprising an axially open, groove-like (groove shape) recess provided on the front side of the bottom element.

In order to make possible in the process the entry of exhaust gas into the exhaust gas passage ducts, at least one and preferably each exhaust gas passage duct may be open radially outwards in the area of an inlet opening formed between the bottom element and the ring shape connection area of the swirl generation element.

In an alternative embodiment, the entry of exhaust gas into the reactant receiving volume formed in the bottom element can be achieved by at least one and preferably each exhaust gas passage duct comprising a hole that is open radially inwardly to the reactant receiving volume and passes through the bottom element. Such a hole may be prepared, for example, as a drilled hole made in the bottom element.

For an efficient mixing of the reactant entering the mixing volume with exhaust gas entering into the mixing volume, the mixing volume provided in the swirl generation element may be configured as a mixing volume expanding radially starting from the bottom element in the direction of the opening axis.

It is advantageous, in principle, for a uniform and efficient mixing of exhaust gas and reactant to generate a swirling flow that is concentric and essentially symmetrical to the opening axis, which may essentially also correspond to a central longitudinal axis of the swirl generation element and of the mixing volume. However, since it is not possible, in principle, to guarantee, depending on the integration of the mixer device into the exhaust gas stream, that exhaust gas will arrive uniformly at the swirl generation element in all circumferential areas, it is proposed for a configuration of the swirl generation element that compensates a non-uniform incoming flow of exhaust gas that at least some of the exhaust gas passage openings following one another in the circumferential direction are configured with mutually different sizes or/and shapes or/and with different distances to an exhaust gas passage opening directly following in the circumferential direction.

The development of a swirling flow can be supported by at least one flow deflection element being provided in association with at least one and preferably each exhaust gas passage opening at the swirl generation element.

If at least two flow deflection elements provided in association with different exhaust gas passage openings are configured mutually different sizes or/and shapes or/and pitch angles, a non-uniform incoming flow of exhaust gas to the swirl generation element can be compensated thereby as well.

In order not to compromise the development of the swirling flow in the interior of the mixing volume, it is further proposed that at least one and preferably each flow deflection element extend in the direction away from the mixing volume, i.e., outwardly at the swirl generation element.

It is advantageous especially in the case of the above-described, non-symmetrical configuration of the swirl generation element to provide positioning devices for a defined positioning of the swirl generation element in the exhaust gas stream in order to make it possible to preset a defined rotary positioning of the swirl generation element in relation to the bottom element about the opening axis.

A fastening device may be provided on the rear side of the bottom element for connecting a reactant introduction device to the bottom element.

If the fastening device has a plurality of fastening openings, preferably internally threaded openings, which are arranged at circumferentially spaced locations from one another around the reactant introduction opening and are open towards the rear side, the reactant introduction device can be connected to the bottom element in a simple manner, for example, with the use of bolts.

In order to make possible now an adaptation to the structural configuration of a reactant introduction device, at least one fastening opening may have a greater radial distance to the opening axis than at least one other fastening opening.

Since the fastening openings are to be configured, in principle, as openings open only to the rear side of the bottom element in order to avoid leakage of exhaust gas, at least one fastening opening may be provided in the area of a positioning projection of the positioning device, which positioning projection is provided at the bottom element, for an efficient utilization of the material available for forming the bottom element.

The present invention further pertains to an exhaust system, comprising an exhaust gas-carrying component and a mixer device carried at the exhaust gas guiding component with a configuration according to the present invention, wherein a reactant introduction device is arranged on the rear side of the bottom element.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
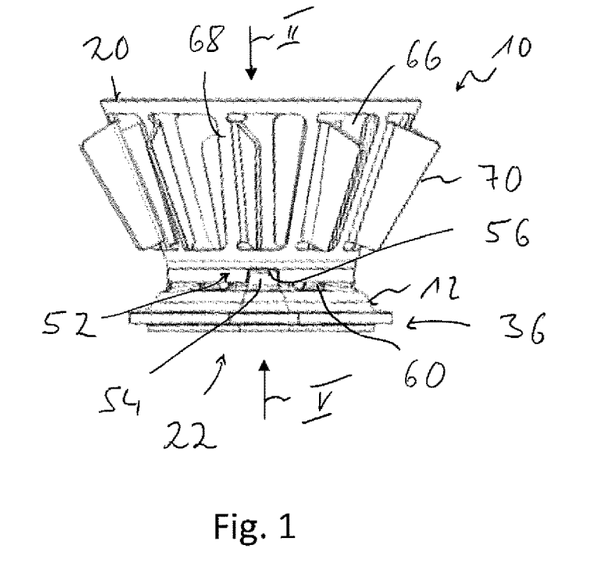
FIG. 1 is a side view of a mixer device for an exhaust gas system of an internal combustion engine in viewing direction I in FIG. 2 and in FIG. 4.
Figure 2:
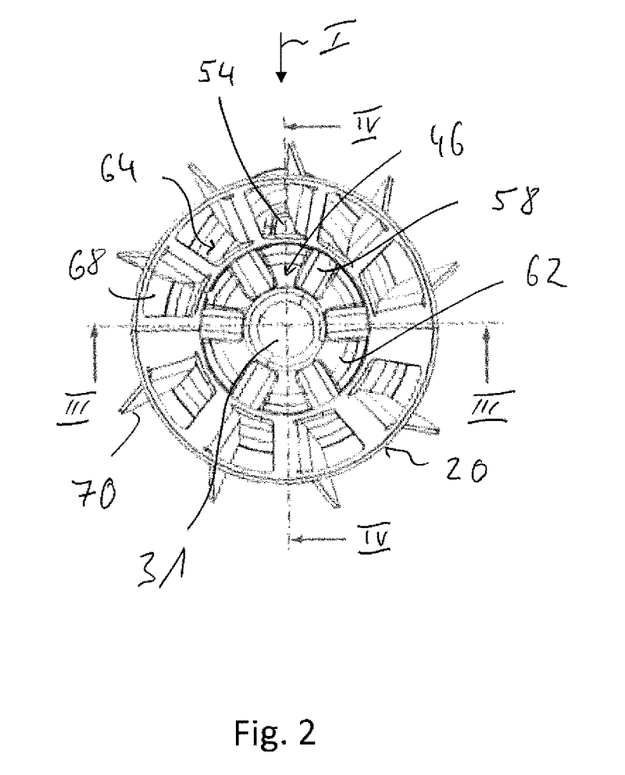
FIG. 2 is a top view of the mixer device according to FIG. 1 in viewing direction II in FIG. 1.
Figure 3:
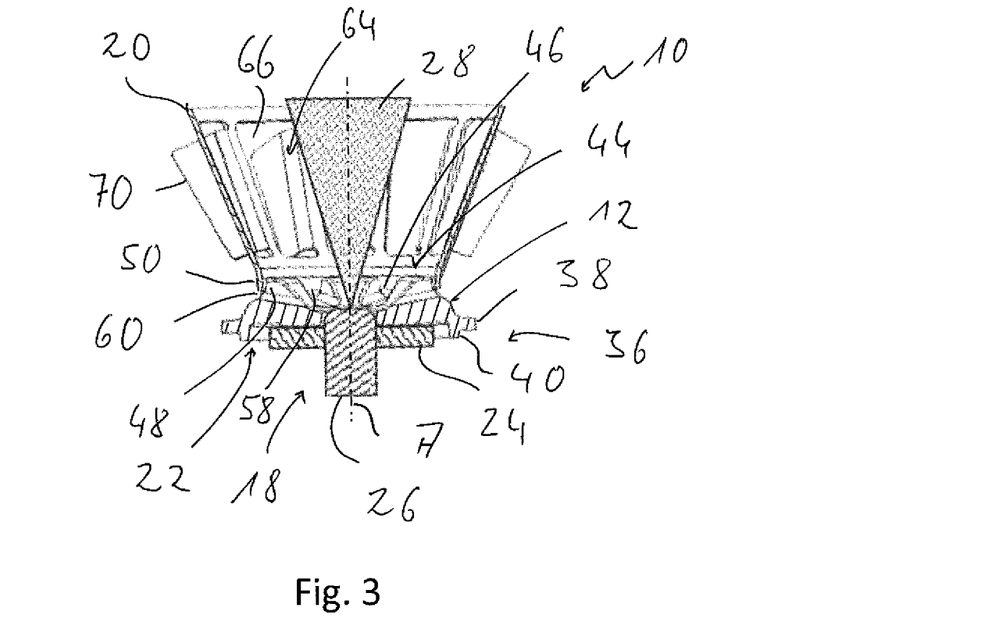
FIG. 3 is a longitudinal sectional view of the mixer device according to FIG. 1, cut along a line III-III in FIG. 2.
Figure 4:
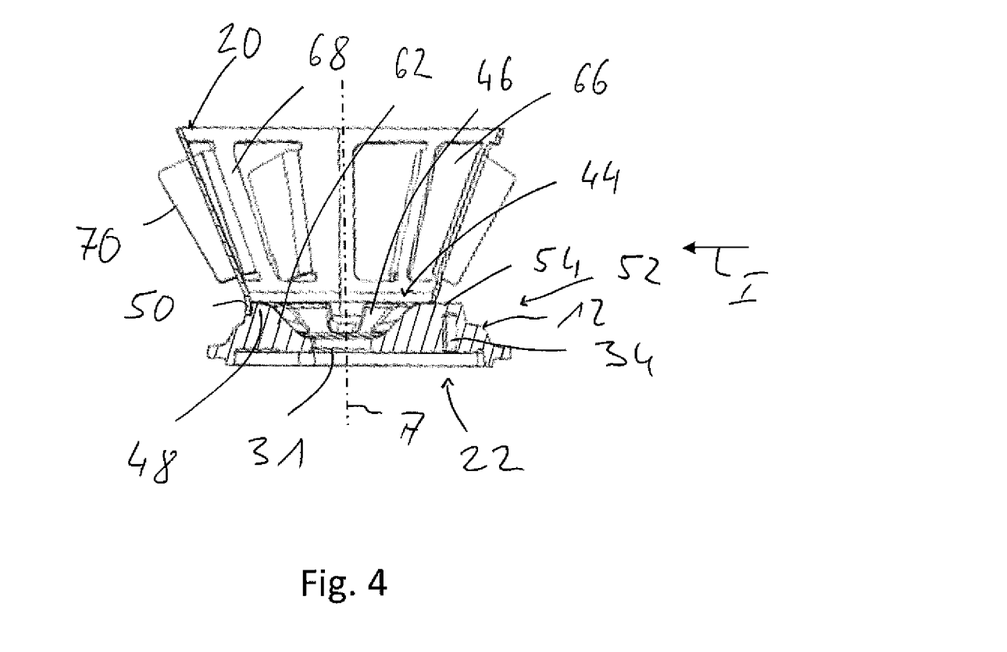
FIG. 4 is a longitudinal sectional view of the mixer device according to FIG. 1, cut along a line IV-IV in FIG. 2.

Referring to the drawings, a mixer device 10 shown in FIGS. 1 through 5 is configured essentially with two components or two assembly units. This is, on the one hand, a bottom element, generally designated by 12, with which the mixer device 10 can be fixed at a component 14 of an exhaust system generally designated by 16, which said component 14 can be seen in FIG. 6 and is, for example, hood-like (hood), and at which component a reactant introduction device generally designated by 18 is arranged, as is shown in FIG. 3. Further, the mixer device 10 comprises a swirl generation element 20, which is connected to the bottom element 12 in the manner described below.

The bottom element 12 may be provided, for example, as a forged component, as a cast component, as a sintered component or as a metal component manufactured by machining The swirl generation element 20 may be configured, for example, as a shaped sheet metal part.

The bottom element 12 has a rear side, generally designated by 22, at which the reactant introduction device 18, generally also called injector, can also be arranged, for example, with a mounting flange 24. An injection nozzle 26, via which the reactant to be injected is released in the form of a spray cone 28, as will be described below and as is suggested in FIG. 3, is carried at the mounting flange 24. A reactant introduction opening 31, in which, for example, the injection nozzle 26 can be positioned by meshing and through which the reactant to be injected is sent or injected, is formed in the bottom element 12.

Figure 5:
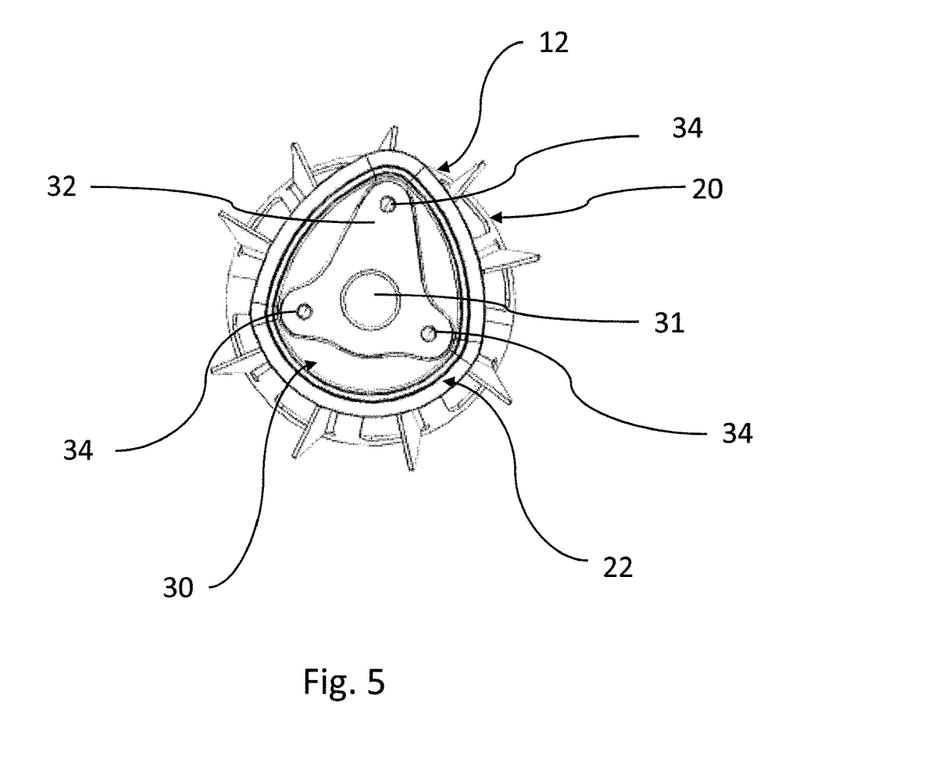
FIG. 5 is a rear view of the mixer device according to FIG. 1, viewed in direction V in FIG. 1.

A fastening device 30, which can be seen in FIG. 5 and via which the reactant introduction device 18 or the mounting flange 24 thereof can be fixed at the bottom element 12, is formed on the rear side 22 of the bottom element 12. The fastening device 30 may comprise, for example, a flat contact surface area 32 formed for being in contact with the mounting flange 24 and a plurality of fastening openings 34, which are arranged at circumferentially spaced locations from one another around the reactant introduction opening 31 and are configured, for example, as internally threaded openings. The shape of the contact surface area 32 and the positioning of the fastening openings 34 may be coordinated with the shape of the mounting flange. In the example shown, the fastening openings 34 have different distances to the reactant introduction opening 31 or to an opening axis shown in FIG. 3 or to an opening central axis A thereof. This causes the bottom element 12 to have, especially in the area of the rear side 22, a slight oval circumferential contour deviating from an essentially round circumferential contour.

Figure 6:
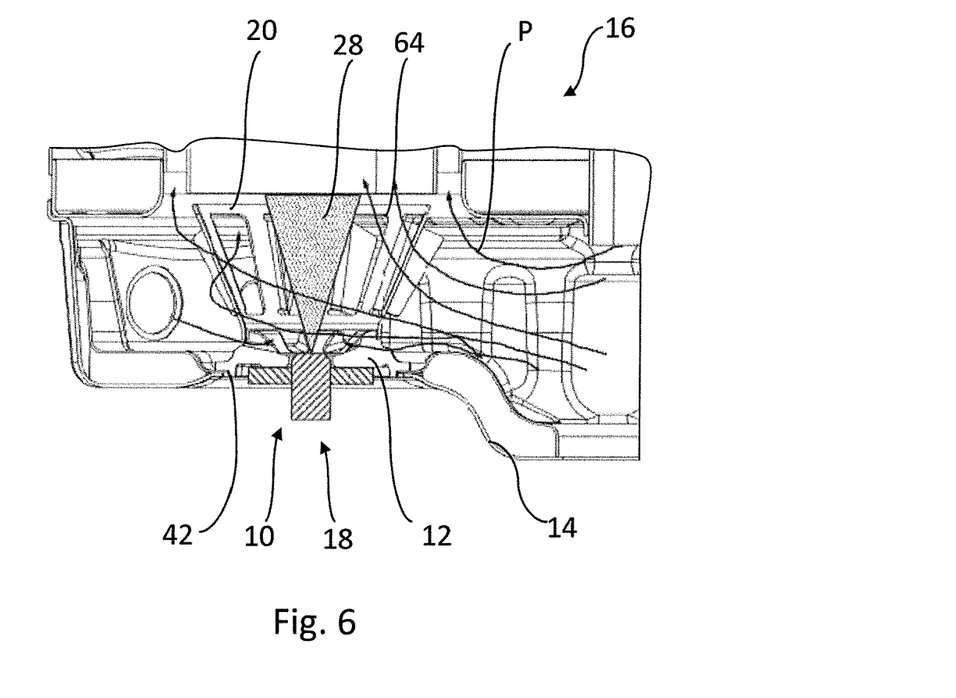
FIG. 6 is a partial view of an exhaust system with a mixer device according to FIG. 1 integrated into same.

Surrounding the fastening device 30 radially on the outside, a connection area 36 is provided at the bottom element 12. This connection area 36 has a radially outwardly projecting connecting flange 38 and, adjoining this radially on the inside, a connecting shoulder 40. As is shown in FIG. 6, the bottom element 12 can be inserted with this connection area 36 into an opening 42 formed in the exhaust gas guiding component 14, for example, from the inner side, so that the connecting flange 38 is in contact with the inner side of the exhaust gas guiding component 14 and a centering of the bottom element 12 in the opening 42 can be provided via the connecting shoulder 40. The bottom element 12 can then be connected permanently and in a gastight manner to the exhaust gas guiding component 14 in the area of the connecting shoulder 40 or of the connecting flange 38, for example, by a weld seam extending circumferentially in the circumferential direction.

A reactant receiving volume 46 is formed in the bottom element 12 on a front side 44 of said bottom element 12. The reactant introduction opening 31 is open towards the reactant receiving volume 46, and the reactant receiving volume 46 has a radially expanding, for example, conical structure in the axial direction, starting from the reactant introduction opening 31, so that the reactant receiving volume 46 has a smaller cross-sectional area at its area located closer to the rear side 22 than at its area located closer to the front side 44.

In the area of the front side 44, the bottom element 12 forms a mounting area 48, which is configured with a step and on which the swirl generation element 20 is placed axially with a ring-like connection area 50 and by which the swirl generation element 20 is positioned in a radially and axially defined manner in relation to the bottom element 12. The swirl generation element 20 may be permanently connected to the bottom element 12, for example, by welding in the area of the connection area 50 overlapping the mounting area 48 and supported axially thereon. In particular, the swirl generation element 20 may be adapted in its ring-like connection area 50 to a corresponding shape of the mounting area 48 with an essentially cylindrical structure for a simple establishment of the connection of the swirl generation element 20 to the bottom element 12.

In order also to achieve a defined rotary positioning or circumferential positioning of the swirl generation element 20 in relation to the bottom element 12, positioning devices generally designated by 52 are provided. The positioning devices 52 comprise, for example, where the fastening opening 34 with a greater distance to the reactant introduction opening 31 is arranged, which said fastening opening is shown in FIG. 5, a positioning projection 54, which is positioned such that it meshes with a positioning recess 56 shown in FIG. 1 in the ring-like connection area 50 of the swirl generation element 20 and thus allows only a single rotary positioning of the swirl generation element 20 in relation to the bottom element 12. It should be pointed out that a plurality of such positioning projections 54 and correspondingly also positioning recesses 56 could also be provided, for example, distributed over the circumference, so that the ring-like connection area may also be multiply interrupted, in principle, in the circumferential direction, even though it continues to provide a generally ring-like overall structure for connecting the swirl generation element 20 to the bottom element 12. Due to the fact that one of the fastening openings 34 is arranged in the area of such a positioning projection 54, and it is consequently positioned such that it overlaps this in the circumferential direction and also in the radial direction, it is guaranteed that the fastening opening 34, which is to be configured as a blind hole to avoid leakages of gas, can be formed in the axially massive material forming the bottom element 12.

A plurality of exhaust gas passage ducts 58 arranged generally in a star-like structure and at spaced locations from one another in the circumferential direction and arranged following one another are provided in the bottom element 12 in association with the reactant receiving volume 46. The exhaust gas passage ducts 58 extend, for example, radially starting from the reactant introduction opening 31 to a radially outwardly area and are basically open axially in the direction of the front side 44 based on their configuration as axial open, groove-like recesses. Corresponding to the shape of the bottom element 12 for providing the expanding geometry of the reactant receiving volume 46, the exhaust gas passage ducts 58 extending essentially radially are oriented at a small angle in the direction of the opening axis A. Radially on the outside, the exhaust gas passage ducts 58 are open via inlet openings 60 outwards, i.e., towards the environment in relation to the mixer device 10. These inlet openings 60 are defined between the bottom element 12 and the ring-like connection area 50 of the swirl generation element 20.

Material areas 62 of the bottom element 12, which also determine essentially the structure of the reactant receiving volume 46, which structure expands radially in the axial direction, are located in the circumferential direction between the exhaust gas passage ducts 58. The fastening openings, which are not positioned in the area of the positioning projection 54 and are likewise configured as blind holes to avoid leakages of gas, may be provided in the area of these material areas 62, i.e., where the bottom element 12 has a comparatively great axial material thickness. A stable connection of the reactant release device 18 to the bottom element 12, which connection is brought about, for example, by screw connection, can be guaranteed in this manner.

The swirl generation element 20 provides in its inner area a mixing volume 64. This mixing volume 64 also has a radially expanding, for example, conical structure in the axial direction, starting from the connection of the swirl generation element 20 to the bottom element 12. A plurality of exhaust gas passage openings 66 arranged at circumferentially spaced locations from one another are provided in the circumferential direction about the opening axis A, which also corresponds to a central longitudinal axis of the swirl generation element 20 and essentially also to the main injection direction, in which the reactant is injected in the form of the spray cone 28 into the reactant receiving volume 46 and into the mixing volume 64. The exhaust gas passage openings 66 may be configured and dimensioned, for example, such that they extend each essentially over nearly the entire axial extension of the swirl generation element 20 and have an increasing circumferential dimension in the direction away from the bottom element 12, so that webs 68 with approximately constant dimensions in the circumferential direction are formed between exhaust gas passage openings 66 located directly adjacent to one another in the circumferential direction.

A clap-like or wing-like flow deflection element 70 is provided in association with each exhaust gas passage opening 66. These may be prepared, for example, such that when preparing an essentially U-shaped slot in the material forming the swirl generation element for preparing a respective exhaust gas passage opening 66, the material area enclosed by this slot is bent off radially outwards, so that a respective exhaust gas passage opening 66 is formed, on the one hand, and, on the other hand, a flow deflection element 70 adjoining a respective web 68 is formed by this material area. The circumferential contour of the flow deflection elements 70 thus also corresponds essentially to the circumferential contour of the respective exhaust gas passage openings 66 associated with these flow deflection elements 70. It is apparent that the flow deflection elements 70 may also have circumferential contours deviating from the circumferential contour of the respective associated exhaust gas passage openings 66 and may be divided, for example, into a plurality of segments, which have different shapes and also different pitch angles, i.e., which are arranged at different angles in relation to the basic geometry of the swirl generation element 20.

It can be clearly seen in FIG. 2 that the exhaust gas passage openings 66 following one another in the circumferential direction are provided with varying circumferential distances. This means that not all exhaust gas passage openings 66 have the same circumferential distance to the directly adjacent exhaust gas passage openings 66, the consequence of which is that webs 68 with different circumferential dimensions are present. The exhaust gas passage openings 66 may basically also have different dimensions relative to another. The flow deflection elements 70 may also have different dimensions relative to one another and may be oriented at different angles in relation to the basic geometry of the swirl generation element 20, i.e., they may be bent off radially outwards to different extents.

FIG. 6 shows the integration of a mixer device 10 having such a configuration into the exhaust system 16. FIG. 6 shows on the basis of flow arrows P the incoming flow of exhaust gas to the mixer device 10 on the outer side thereof.

It can be seen, in particular, that based on the integration into the exhaust system 16, exhaust gas does not arrive uniformly in the circumferential direction at the mixer device 10 in the area of the swirl generation element 20 and basically a non-uniform inlet characteristic of the exhaust gas into the mixing volume 64 would thus develop during the generation of a swirling flow. This non-uniform incoming flow is compensated by the above-described varying positioning or/and different dimensioning or/and different shaping of the exhaust gas passage openings 66 and also of the flow deflection elements 70. Despite the fact that the flow arrives differently in the circumferential direction at the swirl generation element 20, an approximately concentric and nearly symmetrical swirling flow can be generated in this manner in relation to the opening axis A during the entry of exhaust gas into the mixing volume, so that a very uniform mixing with the reactant injected into the mixing volume 64 in the form of the spray cone 28 can be generated as well.

However, the exhaust gas arriving at the mixer device 10 from the outside flows into the mixing volume 64 not only via the exhaust gas passage openings 66, but it also flows via the inlet openings 60 and the exhaust gas passage ducts 58 into the reactant receiving volume 46 in the area in which the reactant is discharged from the injection nozzle 26 of the reactant introduction device 18. An exhaust gas stream is generated hereby in the interior of the reactant receiving volume 46, and, starting from the surface of the bottom element 12, this [exhaust gas stream] envelopes the spray cone 28, i.e., it thus forms a bypass flow. This bypass flow guides the reactant released from the reactant receiving volume in the form of the spray cone 28 into the mixing volume 64, where the primary mixing with exhaust gas will then take place.

It is guaranteed by the generation of this exhaust gas stream introduced into the reactant receiving volume 46 that swirling or backflow cannot lead to the precipitation of reactant droplets in the area of the surface of the bottom element 12, i.e., in the area of the reactant receiving volume 46, at the bottom element 12 and to the ability of deposits to form. The generation of such a bypass flow guarantees that essentially the total quantity of reactant released will enter into the mixing volume 64 and will likewise be available there for the mixing with the exhaust gas introduced into the mixing volume 64 in the form of a swirling flow. At the same time, the flow of the hot combustion waste gases around the bottom element 12 in the area of the reactant receiving volume 46 guarantees that a cooling of the bottom element 12, which supports the formation of deposits, is avoided.

It is guaranteed by the configuration according to the present invention of a mixer device that while the risk of formation of deposits is markedly reduced based on a very uniform release of the reactant into the mixing volume and based on the possibility of generating a highly uniform swirling flow with a structure essentially concentric to the opening axis A, highly efficient mixing of reactant with exhaust gas and an efficient evaporation of exhaust gas reactant can be brought about, which can, in turn, lead to an improved exhaust gas purification especially in case of a cold start or at low load points in an SCR catalytic converter device following downstream.

It should finally be pointed out that the mixer device shown in the figures and described in detail above may be varied in different aspects. For example, the arrangement or/and shape of the exhaust gas passage openings and of the flow deflection elements may thus be adapted to the structure of a respective exhaust system and the flow guiding in an exhaust system may be selected differently than shown. The number and the dimensioning of the exhaust gas passage ducts may also differ from the arrangement and dimensioning shown. These exhaust gas passage ducts may also be provided basically as holes extending in the interior of the bottom element, for example, by means of drilled holes, which are open radially outwards, on the one hand, and are open, on the other hand, to the reactant receiving volume in the area of the surface of the bottom element, which surface encloses the reactant receiving volume. Regardless of the form in which the exhaust gas passage ducts are configured, it should, however, be noted that these do not intersect with fastening openings used to connect the reactant release device, which ultimately means that the fastening openings, on the one hand, and the exhaust gas passage ducts, on the other hand, are to be arranged in different circumferential areas in relation to the opening axis.

While specific embodiments of the invention have been shown and described in detail to illustrate the application of the principles of the invention, it will be understood that the invention may be embodied otherwise without departing from such principles.

What is claimed is:

1. A mixer device for an exhaust system of an internal combustion engine, the mixer device comprising:
   a bottom element with a rear side to be positioned facing away from an exhaust gas stream in the exhaust system and with a front side to be positioned facing the exhaust gas stream, the bottom element forming a reactant introduction opening that is open to a reactant receiving volume formed in the bottom element on the front side thereof such as to expand radially in a direction of an opening axis on the front side of the bottom element starting from the reactant introduction opening, the bottom element having a plurality of exhaust gas passage ducts arranged following one another in a circumferential direction about the opening axis and open to the reactant receiving volume, the exhaust gas passage ducts comprising axially open, groove shape recesses provided on the front side of the bottom element such as to be spaced in the circumferential direction by material areas of the bottom element defining the radially expanding structure of the reactant receiving volume in the bottom element; and a swirl generation element connected to the bottom element and having a ring shape configuration enclosing the opening axis, the swirl generation element forming a mixing volume adjoining the reactant receiving volume in the direction of the opening axis and the swirl generation element having a plurality of exhaust gas passage openings following one another in the circumferential direction about the opening axis.

2. The mixer device in accordance with claim 1, wherein the swirl generation element is placed axially with a ring shape connection area onto a mounting area on the front side of the bottom element and is connected to the bottom element.

3. The mixer device in accordance with claim 1, wherein at least one of the exhaust gas passage ducts is open radially outwards in the area of an inlet opening formed between the bottom element and the ring shape connection area of the swirl generation element.

4. The mixer device in accordance with claim 1, wherein at least one of the exhaust gas passage ducts comprises a hole, which is open radially inwards to the reactant receiving volume and passes through the bottom element.

5. The mixer device in accordance with claim 1, wherein the mixing volume is provided in the swirl generation element having a radially expanding configuration starting from the bottom element and extending in the direction of the opening axis.

6. The mixer device in accordance with claim 1, wherein at least some of the exhaust gas passage openings following one another in the circumferential direction are configured with mutually different sizes or/and shapes or/and with different distances from an exhaust gas passage opening following directly in the circumferential direction.

7. The mixer device in accordance with claim 1, wherein at least one flow deflection element is provided in association with at least one of the exhaust gas passage openings at the swirl generation element.

8. The mixer device in accordance with claim 7, wherein at least two flow deflection elements provided in association with different exhaust gas passage openings are configured with mutually different sizes or/and shapes or/and pitch angles, or/and wherein at least one flow deflection element of the at least two flow deflection elements extends in the direction away from the mixing volume.

9. The mixer device in accordance with claim 1, further comprising a positioning device provided for predefining a defined rotary positioning of the swirl generation element in relation to the bottom element about the opening axis.

10. The mixer device in accordance with claim 1, further comprising a fastening device for arranging a reactant release device at the bottom element, the fastening device being provided on the rear side of the bottom element.

11. The mixer device in accordance with claim 10, wherein the fastening device comprises a plurality of fastening openings arranged at circumferentially spaced locations around the reactant introduction opening and open to the rear side.

12. The mixer device in accordance with claim 11, wherein at least one of the fastening openings has a greater radial distance to the opening axis than at least one other of the fastening openings.

13. The mixer device in accordance with claim 9, wherein:
the positioning device comprises a positioning projection provided at the bottom element;
the fastening device comprises a plurality of fastening openings; and
at least one of the fastening openings is provided in an area of the positioning projection.

14. An exhaust system comprising:
an exhaust gas guide component; and
a mixer device carried at the exhaust gas guide component, the mixer device comprising:
a bottom element with a rear side to be positioned facing away from an exhaust gas stream in the exhaust system and with a front side to be positioned facing the exhaust gas stream, the bottom element forming a reactant introduction opening that is open to a reactant receiving volume formed in the bottom element on the front side thereof such as to expand radially in a direction of an opening axis on the front side of the bottom element starting from the reactant introduction opening, the bottom element having a plurality of exhaust gas passage ducts arranged following one another in a circumferential direction about the opening axis and open to the reactant receiving volume, the exhaust gas passage ducts comprising axially open, groove shape recesses provided on the front side of the bottom element such as to be spaced in the circumferential direction by material areas of the bottom element defining the radially expanding structure of the reactant receiving volume in the bottom element; and
a swirl generation element connected to the bottom element and having a ring shape configuration enclosing the opening axis, the swirl generation element forming a mixing volume adjoining the reactant receiving volume in the direction of the opening axis and the swirl generation element having a plurality of exhaust gas passage openings following one another in the circumferential direction about the opening axis; and
a reactant introduction device arranged on the rear side of the bottom element.

15. The exhaust system in accordance with claim 14, wherein the swirl generation element is placed axially with a ring shape connection area onto a mounting area on the front side of the bottom element and is connected to the bottom element.

16. The exhaust system in accordance with claim 14, wherein at least one of the exhaust gas passage ducts is open radially outwards in the area of an inlet opening formed between the bottom element and the ring shape connection area of the swirl generation element.

17. The exhaust system in accordance with claim 14, wherein at least one of the exhaust gas passage ducts comprises a hole, which is open radially inwards to the reactant receiving volume and passes through the bottom element.

18. The exhaust system in accordance with claim 14, wherein the mixing volume is provided in the swirl generation element having a radially expanding configuration starting from the bottom element and extending in the direction of the opening axis.

19. A mixer device for an exhaust system of an internal combustion engine, the mixer device comprising:

a bottom element with a rear side arranged away from an exhaust gas stream in the exhaust system, and with a front side arranged facing the exhaust gas stream, said bottom element defining a reactant introduction opening, said front side defining a reactant receiving volume having a radially expanding shape about an opening axis, and starting from the reactant introduction opening in a direction from said rear side to said front side, the bottom element defining a plurality of exhaust gas passage ducts, each of said plurality of exhaust gas passage ducts being arranged one after the other in a circumferential direction about said opening axis and extending from a radial outside of said bottom element to said reactant receiving volume, said each exhaust gas passage duct having an open groove shape recess defined by said front side of the bottom element, each said open groove shaped recess being open in a direction of said opening axis, said each open groove shaped recess being spaced in said circumferential direction; and a swirl generation element connected to said bottom element and having a ring shape configuration enclosing said opening axis, said swirl generation element defining a mixing volume adjoining said reactant receiving volume in said direction of said opening axis, said swirl generation element having a plurality of exhaust gas passage openings following one another in said circumferential direction about said opening axis.

20. The mixer device in accordance with claim 19, wherein:

said front side includes a material area between said each open groove shaped recess, each said material area extending radially inward and defining said radially expanding shape.

\* \* \* \* \*